Patented May 23, 1933

1,911,104

UNITED STATES PATENT OFFICE

EDMOND H. BUCY, OF WAUKEGAN, ILLINOIS, ASSIGNOR TO BREVOLITE LACQUER CO., OF NORTH CHICAGO, ILLINOIS, A CORPORATION OF ILLINOIS

PROCESS FOR DISPERSING PIGMENTS IN CELLULOSE ESTER SOLUTIONS AND PRODUCTS OBTAINED THEREBY

No Drawing.      Application filed July 14, 1932. Serial No. 622,479.

This invention relates primarily to the preparation of pigmented cellulose nitrate or other cellulose ester lacquers applicable to any particular kind of surface or any particular kind of object to be coated.

When cellulose nitrate lacquers were first made, certain disadvantages were shown by them, because they had to be applied on a primer, upon which the thinness of the nitro-cellulose lacquers acted as a paint or varnish remover. Moreover, the various solvents dried at different rates and the lacquer dried altogether so quickly so as to form the unsightly orange peel effect. Such a surface had to be rubbed with coarse abrasives, whereby, however, scratches were formed, which could hardly be removed by a final polish rubbing. As the regular routine in big lacquering plants it was required that one application, made with an air gun, be dry within a certain interval to allow the next following application; these disturbances by irregularities were severely felt.

It was, therefore, a great progress when one learned to make lacquers of low viscosity cellulose nitrate together with gums, softeners, plasticizers and stabilizers, for one could incorporate from 3 to 5 times as much low viscosity cellulose nitrate to obtain the same viscosity as with ordinary cellulose nitrate. On the other side one needed very much higher proportions of solvents with ordinary cellulose nitrate than with low viscose nitrate; it is thus obvious that one coat of the latter equals several of the former, which is of course of great economical value.

The proportion of pigment in a film of nitro-cellulose varies according to circumstances and may approximately be almost one-half of the total weight of the film.

It is, however, by no means so easy to manufacture low viscosity cellulose nitrate solutions which are as opaque and homogeneous as required by the various industries consuming such lacquers, particularly the automobile and furniture industries.

Pigment must be added in proper proportions to not only give good covering capacity to the lacquer, but also to exclude the actinic rays which otherwise would deteriorate the lacquer.

The processes of the prior art were not only too cumbersome, because they required that first a solution of the nitro-cellulose had to be made in a solvent which in most cases was inherently combustible, or, if non-ignitable, contained such combustible ingredients. Or, if the cellulose nitrate was broken up in a colloid mill, the further utilization of the dispersed cellulose nitrate required certain steps which to perform entailed much time, labor and a great outlay of money.

I have now found out that I can manufacture nitro-cellulose and other cellulose ester lacquers by first pre-dispersing a pigment in combination with a combination of a dry cellulose ester, such as dry nitro-cellulose, in a mixture of liquids which are devoid of any dissolving effect upon the cellulose ester.

For the better understanding of my new invention I shall describe the same and cite its application upon nitro-cellulose as an example, of how I may proceed in carrying the same into effect to produce a lacquer having a high content of pigment, of great opaqueness and desirable homogeneousness.

I prepare first a mixture of 5 parts low viscosity nitro-cellulose, 5 parts titanium oxide, ¼ part ethylacetate, ¼ part blown castor oil, and 7 parts of a very low boiling.

Petroleum naphtha, preferably of 70–175° C. B. P., put the mixture into a pebble mill and allow to rotate it therein for approximately 24 hours, or longer, if the desired effect, described below, has not yet been reached.

Running the batch of above mentioned proportions completely disperses the pigment and the nitro-cellulose. It may be assumed that the nitro-cellulose takes up the ethylacetate as well as the castor oil, which liquids probably aid in breaking up the nitro-cellulose particles and allow the intimate mixture of the pigment therewith.

The mixture is then removed from the mill and the petroleum naphtha is strained off. The mixture of pigment and nitrocellulose remains and, being still slightly wet with petroleum naphtha, it is then dissolved in any desirable nitro-cellulose solvent, whereby a completely dispersed pigment in nitro-cellulose solution is obtained.

*Example II*

I treat in the manner described by Example I the following mixture:—1 gallon of any desirable varnish, for instance of any of the well known spar varnish, ½–⅛ gallon of a solvent, such as butyl-lactate, 2 pts. of the cellulose-nitrate pigment mixture as described by Example I, the finished product being a lacquer of great opaqueness and covering power.

*Example III*

For the production of a plastic material I may proceed as described by Example I, with the difference that, depending upon the degree of plasticity, I increase the amount of pigment in any proportion upwards from 5 parts of pigment, such as titanium oxide, zinc oxide, white lead, and other white metal colors, mixtures of white metal oxides, such as zinc oxide with colored metal oxides, such as cobalt oxide, iron oxide, or with colored insoluble metal salts or compounds, such as red lead, chrome yellow, chrome red, ochre, sienna, umber, prussian blue, chrome greens, zinc greens, ultramarine and other compounds known and applied as pigments, including in this expression carbon black and also the various insoluble lakes of dyestuffs obtained by combining dyestuffs with bases or by precipitating dye-stuffs on the various substrata known to the art.

In view of the low price at which such plastic materials often have to be made, I may introduce into the mass any suitable inert mass of low price, such as wood flour, clay, infusorial earth, brick powder, etc.

In order to facilitate the proper dispersion, I may also increase the quantity of the petroleum naphtha for the work in the pebble mill, while of course the quantity of the solvent applied after the petroleum naphtha is drained off, may be either nil or as much as the desired plasticity may require.

What I claim is:

1. The process for dispersing pigments in cellulose ester solutions, said process consisting in slowly grinding a mixture of the pigment and the cellulose ester with an agent, capable of causing said ester to swell, and an oxidized vegetable oil in a low boiling hydrocarbon until a homogeneous mixture is obtained, separating the low boiling hydrocarbon from the reaction product, and acting on the residue with a solvent for the cellulose ester thereby dispersing the pigment in the solution of the cellulose.

2. The process for dispersing pigments in cellulose ester solutions, said process consisting in slowly grinding a mixture of the pigment and of nitro-cellulose with an agent, capable of causing said nitro-cellulose to swell, and oxidized castor oil in a low boiling petroleum naphtha, until a homogeneous mixture is obtained, separating the petroleum naphtha from the reaction product, and acting on the residue with a solvent for the nitro-cellulose.

In witness whereof I hereunto set my hand.

EDMOND H. BUCY.